(12) United States Patent
Zhang et al.

(10) Patent No.: US 8,318,122 B2
(45) Date of Patent: Nov. 27, 2012

(54) PREPARATION OF A CARBON NANOMATERIAL USING A REVERSE MICROEMULSION

(76) Inventors: Cheng Zhang, Pennington, NJ (US); Bing Zhou, Cranbury, NJ (US)

( * ) Notice: Subject to any disclaimer, the term of this patent is extended or adjusted under 35 U.S.C. 154(b) by 486 days.

(21) Appl. No.: 12/248,993

(22) Filed: Oct. 10, 2008

(65) Prior Publication Data
US 2010/0092370 A1 Apr. 15, 2010

(51) Int. Cl.
*C01B 31/02* (2006.01)
*B82B 3/00* (2006.01)

(52) U.S. Cl. .............................. 423/445 R; 423/445 B (58) Field of Classification Search .............. 423/445 B, 423/445 R
See application file for complete search history.

(56) References Cited

U.S. PATENT DOCUMENTS

| | | |
|---|---|---|
| 6,297,293 B1 | 10/2001 | Bell et al. |
| 6,475,461 B1 * | 11/2002 | Ohsaki et al. ............. 423/445 R |
| 6,627,314 B2 | 9/2003 | Pyun et al. |
| 6,680,016 B2 | 1/2004 | Wang et al. |
| 6,737,445 B2 | 5/2004 | Bell et al. |
| 6,787,235 B2 * | 9/2004 | Nesbitt et al. ................. 428/408 |
| 6,902,589 B1 * | 6/2005 | Guderian et al. ................ 44/550 |
| 6,919,063 B2 | 7/2005 | Jang et al. |
| 7,056,455 B2 | 6/2006 | Matyjaszewski et al. |
| 2005/0214539 A1 | 9/2005 | Ying et al. |
| 2006/0223947 A1 | 10/2006 | Olesik et al. |
| 2007/0082255 A1 | 4/2007 | Sun et al. |
| 2007/0265162 A1 | 11/2007 | Zhang et al. |
| 2008/0032135 A1 | 2/2008 | Takahashi et al. |
| 2008/0152576 A1 | 6/2008 | Zhang et al. |

FOREIGN PATENT DOCUMENTS
KR 20040002348 1/2004

OTHER PUBLICATIONS

Even Jr. et al., 'Emulsion-Derived Foams:Preparation, Properties and Application' in MRS Bulletin pp. 29-33 Apr. 1994.*
Fujikawa et al., "Shape-controlled synthesis of nanocarbons from resorcinol-formaldehyde nanopolymers using surfactant-templated vesicular assemblies", vol. 45, Issue 6, (May 2007), pp. 1289-1295.

* cited by examiner

*Primary Examiner* — Stuart Hendrickson
(74) *Attorney, Agent, or Firm* — Workman Nydegger (57) ABSTRACT

Powdered, amorphous carbon nanomaterials are formed from a carbon precursor in reverse microemulsion that includes organic solvent, surfactant and water. Methods for manufacturing amorphous, powdered carbon nanomaterials generally include steps of (1) forming a reverse microemulsion including at least one non-polar solvent, at least one surfactant, and at least one polar solvent, (2) adding at least one carbon precursor substance to the reverse microemulsion, (3) reacting the at least one carbon precursor substance so as to form an intermediate carbon nanomaterial, (4) separating the intermediate amorphous carbon nanomaterial from the reverse microemulsion, and (5) heating the intermediate amorphous carbon nanomaterial for a period of time so as to yield an amorphous, powdered carbon nanomaterial. Amorphous, powdered carbon nanomaterials manufactured according to the present disclosure typically have a surface area of at least 500 $m^2/g$, a graphitic content of at least 25%, and a conductivity of at least 150 S/m.

15 Claims, 4 Drawing Sheets

PREPARATION OF A CARBON NANOMATERIAL USING A REVERSE MICROEMULSION

BACKGROUND OF THE INVENTION

1. The Field of the Invention

The present invention relates generally to the manufacture of carbon nanomaterials using a reverse microemulsion.

2. The Related Technology

Carbon materials have been used in a variety of fields as high-performance and functional materials. Some carbon materials such as graphite or diamond occur naturally, while others are manufactured. Pyrolysis of organic compounds is one of the most useful methods to prepare carbon materials. For example, carbon materials can be produced by pyrolyzing resorcinol-formaldehyde gel at temperatures above 600° C.

Most carbon materials obtained by pyrolysis of organic compounds at temperatures between 600-1400° C. tend to be amorphous. Amorphous carbon materials are solid forms of carbon in which there is no long-range order in the positions of the atoms. It should be appreciated, however, that most of the atoms in an amorphous carbon material are involved in some sort of secondary or tertiary structure, but there is no regular or discernible structure. As such, amorphous carbon materials tend to have little or no graphitic content.

An example of a typical amorphous carbon material is activated carbon. Activated carbon is generally formed via pyrolysis of organic carbon precursor products in the presence of an activating agent, resulting in a high surface area material useful for water treatment, catalyst supports, separations, etc. Activated carbon typically has a broad pore size range mainly in the microporous range and activated carbon is generally not conductive.

Graphite is characterized by layers formed from sheets on fused hexagonal rings of carbon in the $sp^2$ hybridization state. So-called graphitic nanostructures, which include fallerenes and fullerene-like structures, are characterized, for example, by ball or rod structures made up primarily of $sp^2$ hybridized carbon.

Obtaining highly crystalline or graphitic carbon materials can be very advantageous because of the unique properties exhibited by graphite and graphitic materials.

BRIEF SUMMARY OF THE INVENTION

The present invention relates to novel carbon nanomaterials and methods for their manufacture. During the manufacturing process, an intermediate carbon nanomaterial is produced in the presence of a reverse microemulsion. The intermediate carbon nanomaterial is separated from the reverse microemulsion and carbonized to produce a carbon nanomaterial.

In one embodiment, the present invention includes a carbon nanomaterial. In one embodiment, the carbon nanomaterial is an amorphous powder (i.e., the carbon nanomaterial does not include significant amounts of nanospheres, nanotubes, or other carbon nanostructures recognizable by transmission electron microscopy (TEM)). Nonetheless, the amorphous, powdered carbon nanomaterial described herein has a surprisingly and unexpectedly high surface area, graphitic content, and conductivity as compared to other carbon materials.

In one embodiment, the amorphous, powdered carbon nanomaterial has a surface area of at least 500 $m^2/g$, more preferably at least 800 $m^2/g$, and most preferably at least 1000 $m^2/g$.

In one embodiment, the amorphous, powdered carbon nanomaterial has a graphitic content of at least 25%, preferably at least 45%, more preferably at least 65%, even more preferably at least 75%, and most preferably at least 80%.

In one embodiment, the amorphous, powdered carbon nanomaterial has a conductivity of at least 150 Siemens/meter (S/m), more preferably at least 175 S/m, even more preferably at least 200±~10 S/m, most preferably at least 225 S/m.

In one embodiment, the present invention includes a method for manufacturing a carbon nanomaterial. The method includes steps of (1) forming a reverse microemulsion by vigorously stirring a solution that includes at least one non-polar solvent, at least one surfactant, and at least one polar solvent, (2) adding at least one carbon precursor substance to the reverse microemulsion, (3) optionally adding at least one catalyst to the reverse microemulsion (e.g., $NH_4OH$), (4) reacting the at least one carbon precursor substance for a period of time while stirring and maintaining a temperature so as to form an intermediate amorphous carbon nanomaterial, (5) separating the intermediate amorphous carbon nanomaterial from the reverse microemulsion, and (6) heating the intermediate amorphous carbon nanomaterial so as to yield a carbon nanomaterial.

A reverse microemulsion is a stable, discontinuous liquid-liquid mixture that typically includes a non-polar bulk phase (e.g., hexane), at least one surfactant (e.g., Triton X-100), and a polar solvent that that is immiscible in the non-polar phase (e.g., water). A reverse microemulsion is characterized by the presence of micelles (e.g., micron-scale droplets of polar solvent surrounded by surfactant molecules) suspended in the non-polar bulk phase. This is in contrast to a so-called "direct microemulsion" in which micelles that include a non-polar solvent are suspended in a polar phase.

The non-polar bulk phase solvent(s), the surfactant(s), and the polar solvent are added in a selected ratio so as to form a reverse microemulsion. In one embodiment, the non-polar solvent:surfactant:polar solvent ratio is in a range between about 10:10:1 and about 20:1:1, most preferably the ratio is about 10:2:1.

In one embodiment, carbon precursor substances for use in manufacturing a carbon nanomaterial include, but are not limited to, molecular species that preferentially sequester into the polar micelles in the reverse microemulsion and that include reactive groups that allow for inter-molecular reactions between carbon precursor molecules.

The powdered, amorphous carbon nanomaterials of the present invention can have beneficial properties that result from the unique shape, chemistry and other features of the carbon material. For example, the powdered, amorphous carbon nanomaterials of the present invention can have superior electrical and material properties compared to other amorphous carbon materials, and structured carbon materials such as carbon nanotubes. For example, when mixed with a polymer, the powdered, amorphous carbon nanomaterial provides significantly reduced electrical resistance compared to polymers that include the same weight percent of other amorphous carbon materials.

The high graphitic content, high surface area, and high conductivity associated with the carbon nanomaterial disclosed herein are surprising and unexpected results for an amorphous carbon. These and other advantages and features of the present invention will become more fully apparent from the following description and appended claims as set forth below.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXAMPLE EMBODIMENTS

I. Introduction

The present invention relates to novel carbon nanomaterials and methods for their manufacture. During the manufacturing process, an intermediate carbon nanomaterial is produced in the presence of a reverse microemulsion. The intermediate carbon nanomaterial is separated from the reverse microemulsion and carbonized to produce a carbon nanomaterial.

The amorphous, powdered carbon nanomaterials are formed in part in aqueous micelles in a reverse microemulsion from at least one carbon precursor. Methods for manufacturing amorphous, powdered carbon nanomaterials generally include steps of (1) forming a reverse microemulsion by vigorously stirring a solution that includes at least one organic solvent, at least one surfactant, and water, (2) adding at least one carbon precursor substance to the reverse microemulsion, (3) optionally adding at least one basic catalyst to the reverse microemulsion (e.g., $NH_4OH$), (4) reacting the at least one carbon precursor substance for a period of time (e.g., between about 1 hour and about 5 hours) while stirring and maintaining a temperature (e.g. between about 70° C. and about 80° C.) so as to form an intermediate carbon nanomaterial, (5) separating the intermediate carbon nanomaterial from the reverse microemulsion (e.g., by filtration), and (6) heating the intermediate carbon nanomaterial for a period of time (e.g., between about 1 hour and about 6 hours in the presence of an inert atmosphere) so as to yield a carbon nanomaterial.

The carbon nanostructures manufactured using the foregoing steps are characterized by having amorphous carbon with a surprisingly and unexpectedly high surface area, graphitic content, and conductivity as compared to other carbon materials. For example, an amorphous, powdered carbon nanomaterial manufactured according to the above described method typically has a surface area of at least 500 $m^2/g$, a graphitic content of at least 25%, and a conductivity of at least 150 S/m.

II. Components used to Manufacture Amorphous, Powdered Carbon Nanomaterials

The following components can be used to carry out the above mentioned steps for manufacturing carbon nanomaterials according to the present invention.

A. Non-Polar Solvents

The non-polar solvents used to prepare the carbon nanomaterials of the present invention provide a bulk phase for forming a reverse microemulsion. Various solvents or mixtures of solvents can be used, including non-polar organic solvents.

Solvents participate in the formation of carbon nanomaterials by participating in the formation of a reverse microemulsion by suspending polar micelles. In one embodiment, the character of the non-polar bulk phase may be selected to encourage the carbon precursor molecules to sequester into the polar micelles.

Any type of organic solvent can be used in the present invention provided that it is non-polar and essentially immiscible with the polar solvent(s) selected to form the reverse microemulsion. Suitable examples of organic solvents for use in manufacturing a carbon nanomaterial include, but are not limited to, hexanes, cyclohexane, benzene, diethyl ether, trichloromethane, ethyl acetate, methyl methacrylate, toluene, phenyl ethers, or N-methyl pyrrolidone, and combinations thereof.

B. Polar Solvents

The polar solvents used to prepare the carbon nanomaterials of the present invention provide a suspended micellular phase for forming a reverse microemulsion. Various polar solvents or mixtures of polar solvents can be used, including water.

Polar solvents are selected such that they are immiscible with the bulk phase solvent (i.e., the non-polar solvent) and compatible with the carbon precursor material. In one embodiment, the character of the polar solvent may be selected to encourage the carbon precursor molecules to sequester into the polar micelles that are suspended in the non-polar phase.

Any type of polar solvent can be used in the present invention provided that it is essentially immiscible with the solvent(s) selected to form the reverse microemulsion. Suitable examples of polar solvents for use in manufacturing a carbon nanomaterial include, but are not limited to, water, short-chain alcohols (e.g., butanol, isopropanol, propanol, ethanol, methanol), dioxane, tetrahydrofuran, dichloromethane, acetone, acetonitrile, dimethylformamide, dimethyl sulfoxide, acetic acid, or formic acid, and combinations thereof. In a preferred embodiment, the polar solvent is water. Water is preferred at least in part because it is highly polar, it is non-reactive with either the bulk phase solvent or the carbon precursor materials, it is essentially immiscible in non-polar solvents, and it readily forms micelles with the surfactants discussed herein.

C. Surfactants

The surfactants used to prepare the reverse microemulsion described herein interact with the polar droplets and the organic solvent to stabilize the polar droplets. It is believed, for example, that each droplet of polar solvent in the reverse microemulsion is surrounded by a plurality of surfactant molecules with their polar headgroups being oriented toward polar droplets and their non-polar tails being suspended in the solvent. Such an arrangement stabilizes the reverse microemulsion by overcoming the tendency of the polar droplets to agglomerate or congeal to form progressively larger droplets.

A given surfactant or blend of surfactants is chosen such that it is dispersible or otherwise compatible with a given non-polar, bulk phase solvent and the polar solvent used to form the reverse microemulsion. Moreover, a given surfactant or blend of surfactants is also chosen so as to be compatible with the carbon precursor molecules used to form the carbon nanomaterials.

Examples of suitable surfactants include, but are not limited to, octylphenol ethoxylates, phosphonic acids, phosphinic acids, sulfonic acids, and polyethylene glycol monoalkyl ethers. Example octylphenol ethoxylates include detergents of the Triton-X series. Examples of Triton-X detergents include Triton-X 15, Triton-X 35, Triton-X 45, Triton-X 100, Triton-X 102, Triton-X 114, Triton-X 165, Triton-X 305, Triton-X 405, and Triton-X 705. Polyethylene glycol monoalkyl ethers have the general formula $CH_3(CH_2)_yO(CH_2CH_2O)_xH$. Example polyethylene glycol monoalkyl ethers include tetraethylene glycol monooctyl ether, pentaethylene glycol monooctyl ether, hexaethylene glycol monooctyl ether, pentaethylene glycol monodecyl ether, pentaethylene glycol monodecyl ether, nonaethylene glycol monodecyl ether, octaethylene glycol monododecyl ether, nonaethylene glycol monododecyl ether, decaethylene glycol monododecyl ether, octaethylene glycol monotridecyl ether, and dodecyl glycol monodecyl ether.

D. Carbon Precursor Materials

The carbon precursor materials used to prepare the carbon nanomaterials of the present invention are materials that are capable of oligomerization or polymerization reactions and that provide a carbon nanomaterial when heating to carbonizing temperatures. Any type of carbon material can be used as the carbon precursor of the present invention so long as it can disperse in the reverse microemulsion and sequester preferentially into the polar phase. Suitable compounds include polar organic compounds such as benzene and naphthalene derivatives that have reactive functional groups. Reactive functional groups that can participate in polymerization and/or oligomerization reactions include, but are not limited to, COOH, C=O, OH, C=C, $SO_3$, $NH_2$, SOH, N=C=O, nitrile and the like.

The carbon precursor can be a single type of molecule (e.g., a compound that can polymerize with itself), or the carbon precursor can be a combination of two or more different compounds that co-polymerize together. For example, in an exemplary embodiment, the carbon precursor can be resorcinol-formaldehyde. In this embodiment, the formaldehyde acts as a cross-linking agent between resorcinol molecules by reacting with the hydroxyl groups of the resorcinol molecules.

Other examples of suitable carbon precursors include resorcinol, phenol resin, melarmine-formaldehyde, furfuryl alcohol, polyacrylonitrile monomer (i.e., acrylonitrile or acrylonitrile and a number of co-monomers known to those skilled in the art), sucrose, and the like. Other polymerizable benzenes, quinones, and similar compounds can also be used as carbon precursors and are known to those skilled in the art.

In one embodiment, the carbon precursor is a hydrothermally polymerizable organic compound. Suitable organic compounds of this type include citric acid, acrylic acid, benzoic acid, acrylic ester, butadiene, styrene, cinnamic acid, and the like.

E. Catalysts

In one embodiment, a catalyst material is optionally included to increase the rate of reaction between molecules of the carbon precursor material (i.e., to promote oligomerization or polymerization of the carbon precursor material). Suitable examples of catalysts for use in manufacturing a powdered, amorphous carbon nanomaterial include, but are not limited to, ammonium hydroxide, sodium hydroxide, potassium hydroxide, magnesium hydroxide, calcium hydroxide, sodium bicarbonate, or sodium carbonate, and combinations thereof.

III. Manufacturing Carbon Nanostructures

The carbon nanostructures of the present invention can be manufactured using all or a portion of the following steps: (1) forming a reverse microemulsion by vigorously stirring a solution that includes at least one organic solvent, at least one surfactant, and water, (2) adding at least one carbon precursor substance to the reverse microemulsion, (3) adding at least one catalyst to the reverse microemulsion, (4) reacting the at least one carbon precursor substance in the presence of the catalyst for a period of time between about 1 hour and about 5 hours while stirring and maintaining a temperature between about 70° C. and about 80° C. so as to form an intermediate amorphous carbon nanomaterial, (5) separating the intermediate amorphous carbon nanomaterial from the reverse microemulsion by filtration, and (6) heating the intermediate amorphous carbon nanomaterial for a period of time between about 1 hour and about 6 hours in the presence of an inert atmosphere so as to yield an amorphous, powdered carbon nanomaterial.

A reverse microemulsion will form more-or-less spontaneously if solvent, surfactant, and water are combined in the appropriate ratio. Preferably, the solvent:surfactant:water ratio is in a range between about 10:10:1 and about 20:1:1. Most preferably, the solvent:surfactant:water ratio is about 10:2:1.

Figure 1A:
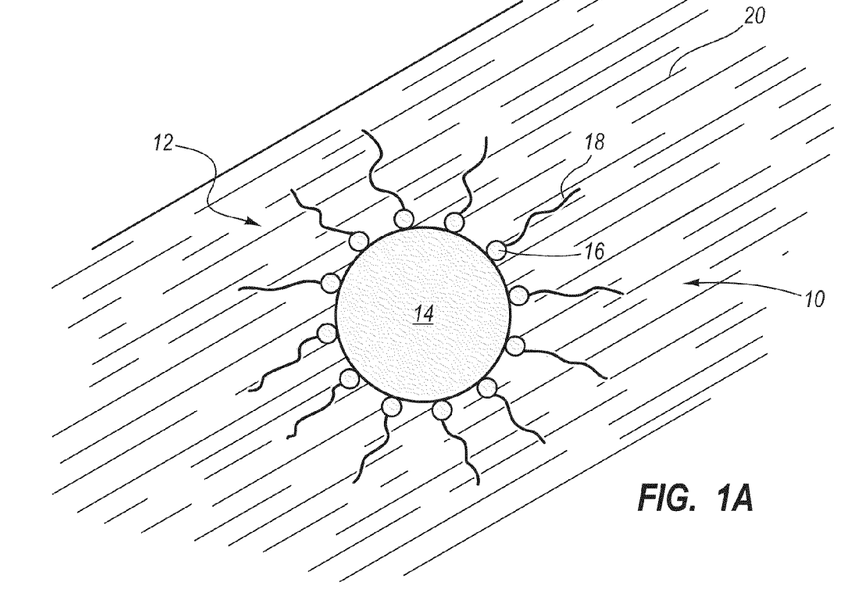
FIG. 1A is a schematic representation of a micelle in reverse microemulsion.

The term "reverse microemulsion" is intended to contrast with direct microemulsions in which non-polar droplets (e.g., oil) are suspended in a polar solvent (e.g., water). An example of a reverse microemulsion is characterized by the presence of water/surfactant micelles suspended in an organic phase. FIG. 1A is a schematic representation of a reverse microemulsion 10. A typical reverse microemulsion 10 includes non-polar micelles 12 suspended in an organic phase 20. Polar micelles consists of micron-scale droplets of polar solvent 14 surrounded by surfactant molecules having their polar headgroups 16 oriented toward the polar droplet and their non-polar tails 18 suspended in the non-polar phase 20.

Carbon precursor materials are selected for their ability to react and form carbon nanomaterials. Carbon precursor materials are also selected such that they are polar and compatible with the polar phase of the reverse microemulsion.

Figure 1B:
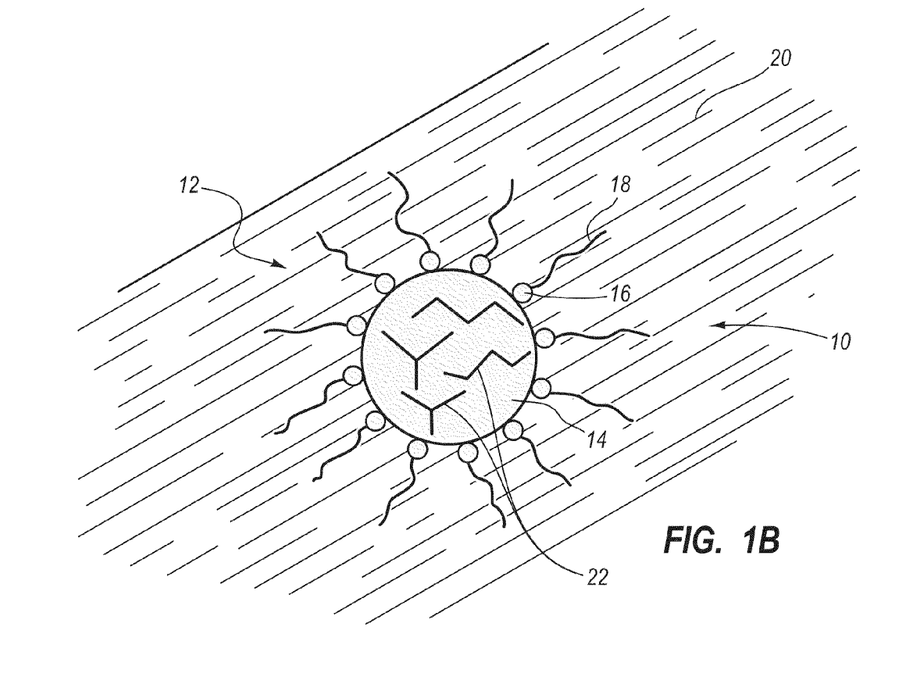
FIG. 1B shows the micelle in the reverse microemulsion of FIG. 1A with a plurality of carbon precursor molecules contained in the droplet.

FIG. 1B is a schematic representation of a reverse microemulsion 10 with a polar micelle containing a plurality of carbon precursor material molecules 22. As in FIG. 1A, the polar micelle 12 is a droplet of polar solvent 14 surrounded by surfactant molecules having their polar headgroups 16 oriented toward the polar droplet and their non-polar tails 18 suspended in the non-polar phase 20. Because the carbon precursor material is selected to be more compatible with the polar phase, it is believed that the carbon precursor material molecules 22 sequester into the polar droplets 14 when they are added to the reverse microemulsion 10.

Sequestration into the polar phase has a number of consequences for the carbon nanomaterial that is produced. For example, it is believed that because the carbon precursor materials are sequestered into the polar droplets that the length of the oligomers and/or polymers formed from the carbon precursor material is limited. It is also believed that the system is prevented from gelling as occurs, for example, in the preparation of carbon nanofoams because interactions between carbon precursor material molecules are limited and higher order structures cannot form.

After the carbon precursor material is added to the reverse microemulsion, a catalyst may optionally be added, which also sequesters into the water phase. The catalyst is preferably a base compound such as, but not limited to, ammonium hydroxide, sodium hydroxide, potassium hydroxide, magnesium hydroxide, calcium hydroxide, sodium bicarbonate, or sodium carbonate, and the like.

The carbon precursor material is reacted (i.e., oligomerized or polymerized) to form an intermediate carbon nanomaterial. For example, the carbon precursor material can be reacted for a period of time between about 1 hour and about 5 hours while a stirring and maintaining a temperature between about 50° C. and about 100° C., preferably between about 60° C. and about 90° C., and more preferably between about 70° C. and about 80° C. either in the absence or presence of a catalyst so as to form an intermediate carbon nanomaterial. The intermediate carbon nanomaterial can then be separated from the reverse microemulsion. For example, the intermediate carbon nanomaterial can be separated by filtration, centrifugation, drying, or another suitable technique.

A. Carbonizing the Precursor Mixture

The intermediate amorphous carbon nanomaterial is carbonized by heating in the presence of an inert atmosphere to form an amorphous, powdered carbon nanomaterial. In one embodiment, the intermediate amorphous carbon nanomaterial can be heated for a period of time between about 1 hour and about 6 hours. Preferably, the intermediate amorphous carbon nanomaterial is carbonized by heating the mixture to a temperature between about 500° C. and about 2000° C. More preferably, the intermediate amorphous carbon nanomaterial is carbonized by heating the mixture to a temperature between about 700° C. and about 1500° C. Most preferably, the intermediate amorphous carbon nanomaterial is carbonized by heating the mixture to a temperature between about 900° C. and about 1100° C. For example, higher temperatures (e.g., temperatures above 500° C.) are preferred because they appear to produce carbon nanomaterials having a higher graphitic content.

During the heating process, atoms such as oxygen and nitrogen are volatilized or otherwise removed from the intermediate amorphous carbon nanomaterial and the carbon atoms are rearranged or coalesced to form a carbon-based structure. The heating or carbonizing step typically produces an amorphous, powdered carbon nanomaterial having a surprisingly and unexpectedly high surface area, graphitic content, and conductivity.

The surface area of the amorphous, powdered carbon nanomaterial is typically measured using the BET approach, which determines the surface area of a material as a function of the physical adsorption of gas molecules. Preferably, the surface area of the amorphous, powdered carbon nanomaterial is at least 500 $m^2/g$. More preferably, the surface area of the amorphous, powdered carbon nanomaterial is at least 800 $m^2/g$. Most preferably, the surface area of the amorphous, powdered carbon nanomaterial is at least 1000 $m^2/g$.

Graphitic content is measured by thermogravimetric analysis (TGA). In a typical TGA analysis, the percent weight loss of a sample is recorded while the sample is being heated at a uniform rate. The loss in weight over specific temperature ranges provides an indication of the chemical composition of the sample. Preferably, the graphitic content of the amorphous, powdered carbon nanomaterial is at least 65%. More preferably, the graphitic content of the amorphous, powdered carbon nanomaterial is at least 75%. Most preferably, the graphitic content of the amorphous, powdered carbon nanomaterial is at least 80%. Graphitic structures have carbon atoms arranged in structured sheets of $sp^2$ hybridized carbon atoms. Graphitic structures can provide unique and beneficial properties, such as electrical conduction and structural strength and/or rigidity.

In one embodiment, it has been found that the carbon nanomaterial of the present invention does not include structured graphitic materials (e.g., fullerenes, carbon nanospheres, and/or carbon nanotubes) as evidenced by observing the carbon nanomaterial under high magnification (e.g., TEM). It is generally believed among those having skill in the art that that structured graphitic materials are needed in order for a carbon material to have high graphitic content, high conductivity, and high surface area. The fact that such structures were not found is surprising and unexpected. While no significant amounts of structured materials were observed in the example preparations presented below, the present invention includes structured materials in addition to amorphous carbon nanomaterials. Moreover, the amorphous carbon nanomaterial can have some ordered arrangement. For example, the amorphous carbon nanomaterial can include, but is not required to include, small, essentially uniform particles of amorphous carbon.

Conductivity measurements were performed to determine the electrical conductivity of the carbon nanomaterial. The measurement cell consists of a quartz capillary and two copper electrodes, connected to a Keithley 228A voltage/current source. The carbon nanomaterial is placed into the quartz capillary and compressed by the copper electrodes. The conductivity is a measurement of the current carrying capacity of the powder between the electrodes. Preferably, the conductivity of the amorphous, powdered carbon nanomaterial is at least 150 S/m. More preferably, the conductivity of the amorphous, powdered carbon nanomaterial is at least 175 S/m. Even more preferably, the conductivity of the amorphous, powdered carbon nanomaterial is at least 200 S/m. Most preferably, the conductivity of the amorphous, powdered carbon nanomaterial is at least 225 S/m.

IV. EXAMPLES

The following examples provide formulas for making powdered, amorphous carbon nanomaterials according to the present invention.

Example 1

Example 1 describes the preparation of a powdered, amorphous carbon nanomaterial.

100 ml of cyclohexane, 20 ml of triton x-100 and 10 ml of deionized $H_2O$ were mixed in one 500 ml three-neck round bottom flask with vigorous stirring to form clear micelles. A resorcinol (24 g) in formaldehyde (35.2 g) solution was slowly added followed by the addition of $NH_4OH$ (18 ml). The resulting creamy-like slurry was cured at 77° C. for 3 hours under vigorous stirring. The solid intermediate amorphous carbon nanomaterial was collected by filtration and dried in an oven overnight. The resulting light-brown solid was carbonized at 1050° C. under $N_2$ flow for 5 hours.

Example 2

Example 2 describes the preparation of a powdered, amorphous carbon nanomaterial.

500 ml of cyclohexane, 100 ml of triton x-100 and 50 ml of deionized $H_2O$ were mixed in one 2000 ml three-neck round bottom flask with vigorous stirring to form clear micelles. A resorcinol (120 g) in formaldehyde (176 g) solution was slowly added followed by the addition of $NH_4OH$ (90 ml).

The resulting creamy-like slurry was cured at 77° C. for 3 hours under vigorous stirring. The solid intermediate amorphous carbon nanomaterial was collected by filtration and dried in an oven overnight. The resulting light-brown solid was carbonized at 650° C. under $N_2$ flow for 5 hours.

Example 3

Example 3 describes the preparation of a powdered, amorphous carbon nanomaterial.

500 ml of cyclohexane, 100 ml of triton x-100 and 50 ml of deionized $H_2O$ were mixed in one 2000 ml three-neck round bottom flask with vigorous stirring to form clear micelles. A resorcinol (120 g) in formaldehyde (176 g) solution was slowly added followed by the addition of $NH_4OH$ (90 ml). The resulting creamy-like slurry was cured at 77° C. for 3 hours under vigorous stirring. The solid intermediate amorphous carbon nanomaterial was collected by filtration and dried in an oven overnight. The resulting light-brown solid was carbonized at 850° C. under $N_2$ flow for 5 hours.

Example 4

Example 4 describes the preparation of a powdered, amorphous carbon nanomaterial.

500 ml of cyclohexane, 100 ml of triton x-100 and 50 ml of deionized $H_2O$ were mixed in one 2000 ml three-neck round bottom flask with vigorous stirring to form clear micelles. A resorcinol (120 g) in formaldehyde (176 g) solution was slowly added followed by the addition of $NH_4OH$ (90 ml). The resulting creamy-like slurry was cured at 77° C. for 3 hours under vigorous stirring. The solid intermediate amorphous carbon nanomaterial was collected by filtration and dried in an oven overnight. The resulting light-brown solid was carbonized at 1050° C. under $N_2$ flow for 5 hours.

Figure 2A:
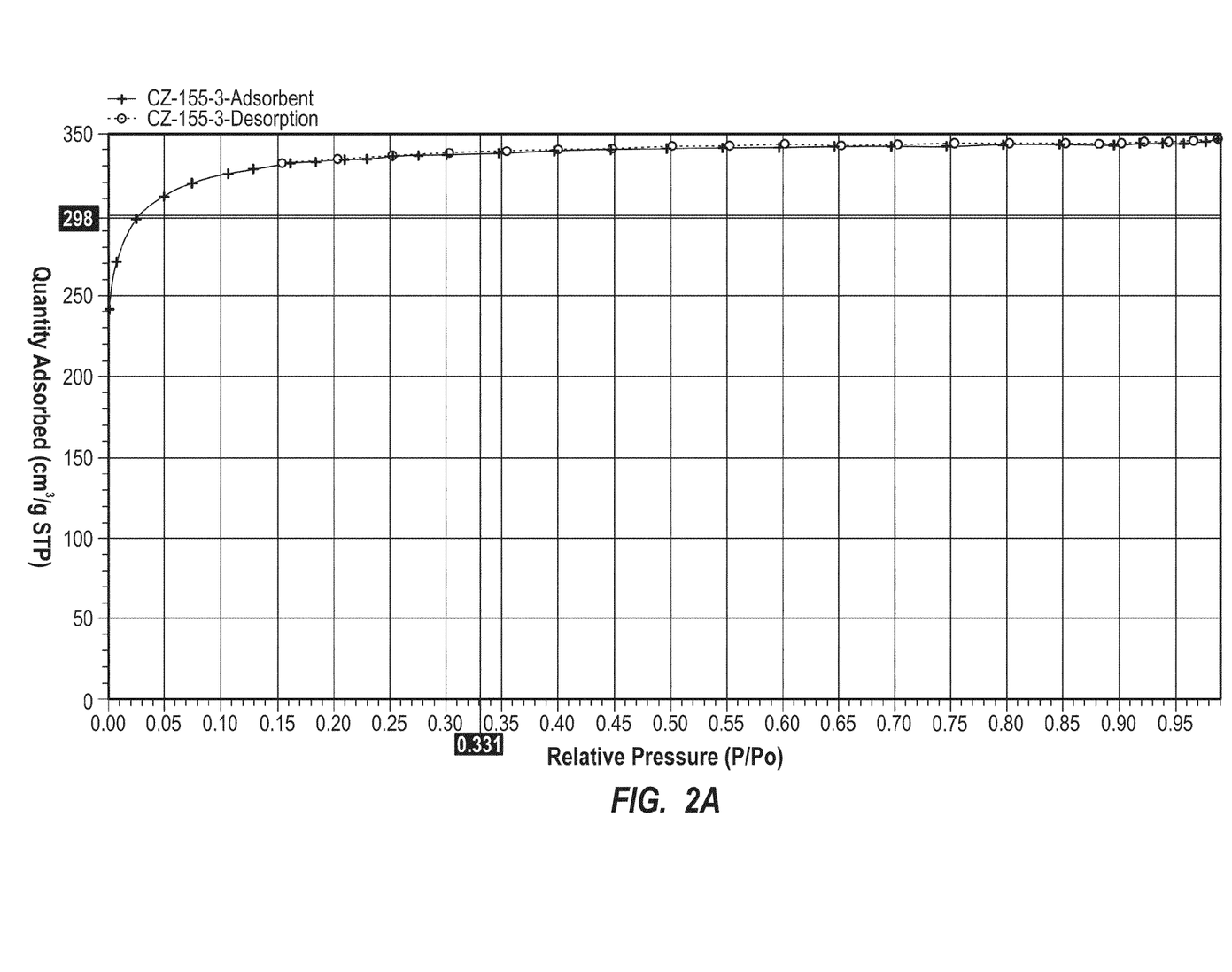
FIG. 2A is a nitrogen adsorption/desorption isotherm showing the weight of nitrogen adsorbed at relative pressure by a powdered, amorphous carbon nanomaterial according to one embodiment of the present invention.

FIG. 2A is a nitrogen adsorption/desorption isotherm showing the weight of nitrogen adsorbed at relative pressure by a powdered, amorphous carbon nanomaterial made according to Example 4. This type of isotherm plot is encountered with microporous powders whose pore size does not exceed a few adsorbate molecular diameters. A gas molecule inside the pores encounters overlapping potential from the pore walls, which enhances the quantity adsorbed at low relative pressures. At higher pressures, the pores are filled by adsorbed adsorbate leading to a plateau, indicating little or no additional adsorption after the micropores have been filled. Physical adsorption that produces this type of isotherm indicates that the pores are microporous and that the exposed surface resides almost exclusively within the micropores, which once filled with adsorbate, leaves little or no external surface for additional adsorption.

Figure 2B:
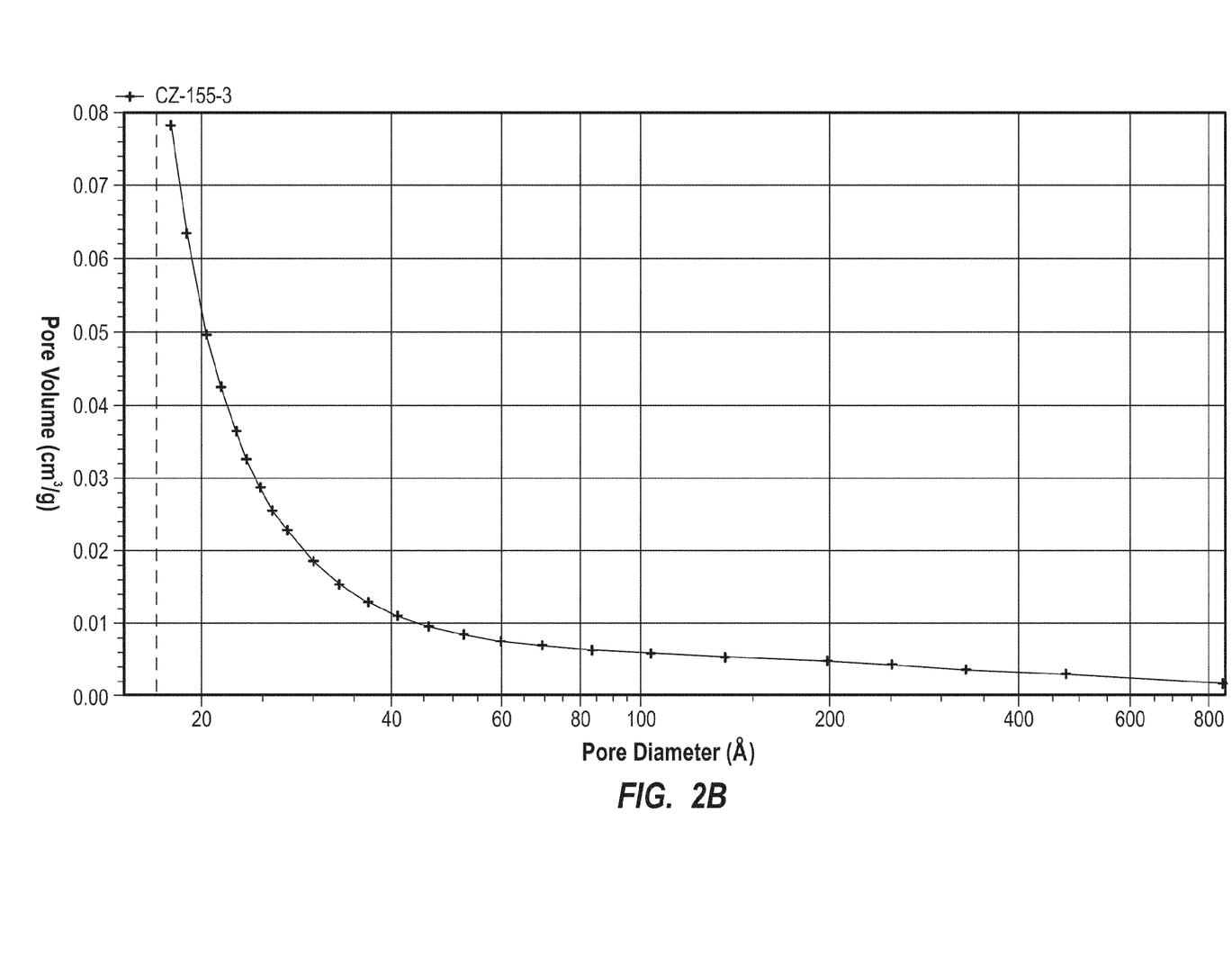
FIG. 2B plot showing the pore volume and the pore diameter of a powdered, amorphous carbon nanomaterial according to one embodiment of the present invention.

FIG. 2B plot showing the pore volume and the pore diameter of a powdered, amorphous carbon nanomaterial made according to Example 4.

Figure 3:
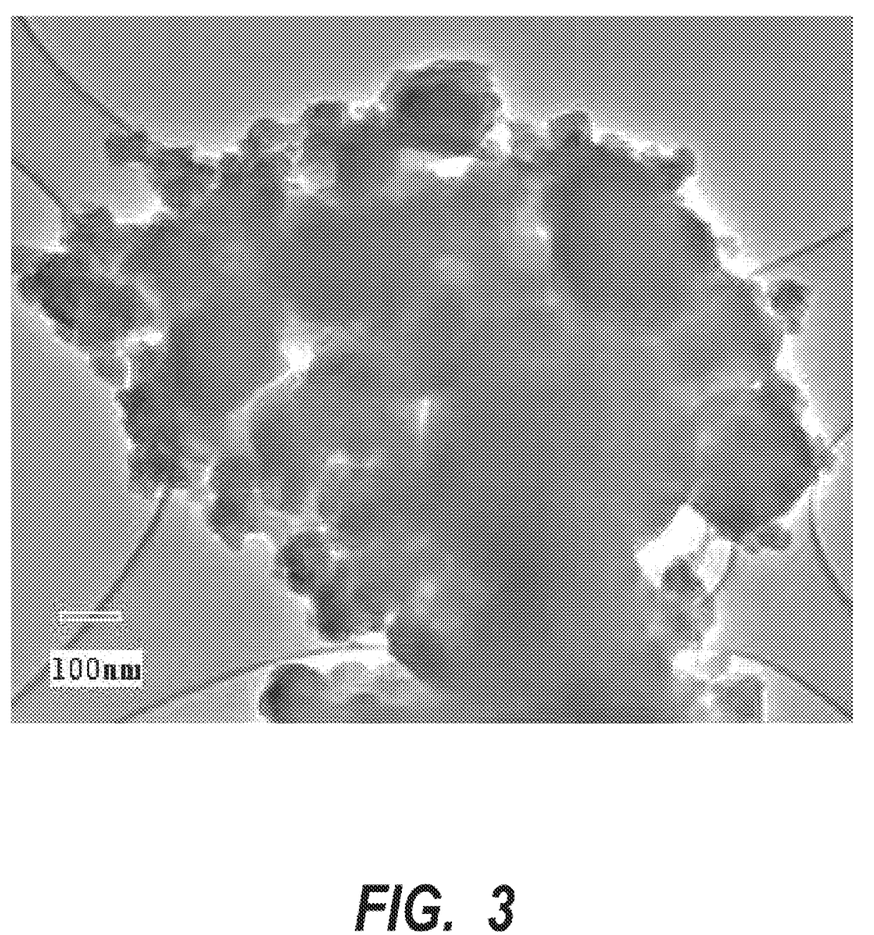
FIG. 3 is a high resolution TEM image showing a powdered, amorphous carbon nanomaterial according to one embodiment of the present invention.

FIG. 3 shows a TEM image of a powdered, amorphous carbon nanomaterial nanomaterial made according to Example 4. In FIG. 3, the TEM image reveals that the carbon nanomaterial is essentially amorphous with no discernible or regular structure.

Table 1 summarizes the surface area, pore volume, pore size, graphitic content, and conductivity for each of Examples 1-4.

TABLE 1

BET surface area, pore analysis, TGA, and conductivity measurement

| Example # | BET surface area (m²/g) | Pore volume (cc/g) | Pore size (nm) | TGA (Graphitic %) | Conductivity (S/m) |
|---|---|---|---|---|---|
| 1 | 1035.25 | 0.53 | 2.0 | 82.5 | |
| 2 | 540.33 | 0.23 | 2.0 | 26.94 | |
| 3 | 766.22 | 0.33 | 1.9 | 69.26 | |
| 4 | 1095.75 | 0.53 | 2.0 | 79.5 | 224.0 ± 12.7 |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for manufacturing an amorphous, powdered carbon nanomaterial composed of carbon particles, the method comprising,
    forming a reverse microemulsion comprising at least one non-polar solvent, at least one surfactant, and at least one polar solvent, the reverse microemulsion being a stable, discontinuous liquid-liquid mixture in which the at least one non-polar solvent forms a bulk phase and the at least one polar solvent forms a disperse phase of polar micelles suspended in the bulk phase;
    adding at least one carbon precursor substance to the reverse microemulsion that preferentially sequesters into the disperse phase of polar micelles rather than the bulk phase comprising the at least one non-polar solvent and that includes reactive groups for forming inter-molecular reactions between carbon precursor molecules;
    reacting the at least one carbon precursor substance in the disperse phase so as to form an intermediate particulate carbon nanomaterial dispersed in the disperse phase of the reverse microemulsion rather than the bulk phase;
    separating the intermediate particulate carbon nanomaterial from the reverse microemulsion; and
    heating the intermediate particulate carbon nanomaterial for a period of time so as to carbonize and transform the particulate carbon nanomaterial into the amorphous, powdered carbon nanomaterial in which at least a portion of the carbon nanomaterial is graphitic.

2. A method as recited in claim 1, wherein the at least one organic solvent, the at least one surfactant, and the water are added in a non-polar solvent:surfactant:polar solvent ratio between about 10:10:1 and about 20:1:1.

3. A method as recited in claim 2, wherein the non-polar solvent:surfactant:polar solvent ratio is about 10:2:1.

4. A method as recited in claim 1, wherein the non-polar solvent includes at least one of hexanes, cyclohexane, benzene, diethyl ether, trichloromethane, ethyl acetate, methyl methacrylate, toluene, phenyl ethers, or N-methyl pyrrolidone.

5. A method as recited in claim 1, wherein the surfactant includes at least one of an octylphenol ethoxylate, a phosphonic acid, a phosphinic acid, a polyethylene glycol monoalkyl ether, or a sulfonic acid.

6. A method as recited in claim 1, wherein the polar solvent includes at least one of water, short-chain alcohols, dioxane, tetrahydrofuran, dichloromethane, acetone, acetonitrile, dimethylformamide, dimethyl sulfoxide, acetic acid, or formic acid.

7. A method as in claim 1, wherein the carbon precursor substance includes at least one of resorcinol-formaldehyde, phenol resin, melamine-formaldehyde, furfuryl alcohol, or acrylonitrile.

8. A method as in claim 1, the heating further comprising carbonizing the intermediate particulate carbon nanomaterial at a temperature between about 500° C. and about 2000° C.

9. A method as in claim 1, the heating further comprising carbonizing the intermediate particulate carbon nanomaterial at a temperature between about 700° C. and about 1500° C.

10. A method as in claim 1, the heating further comprising carbonizing the intermediate particulate carbon nanomaterial for a period of time between about 1 hour and about 6 hours.

11. A method for manufacturing an amorphous, powdered carbon nanomaterial using a reverse microemulsion process, the method comprising, forming a reverse microemulsion by vigorously stirring a mixture containing at least one organic solvent, at least one surfactant, and water, wherein the reverse microemulsion includes a bulk phase comprised of the at least one organic solvent and a disperse phase comprised of a plurality of aqueous micelles suspended in the bulk phase, each of the plurality of micelles comprising:
a water droplet and a plurality of surfactant molecules at least partially suspended in the organic solvent;

adding at least one carbon precursor substance to the reverse microemulsion while stirring vigorously, wherein the at least one carbon precursor substance preferentially sequesters into the water droplets rather than the bulk phase comprising the at least one organic solvent and includes reactive groups for forming intermolecular reactions between carbon precursor molecules;

adding at least one catalyst to the reverse microemulsion containing the plurality of micelles, wherein the at least one catalyst sequesters into the water droplets;

reacting the at least one carbon precursor substance in the disperse phase in the presence of the catalyst for a period of time between about 1 hour and about 5 hours while stirring and maintaining a temperature between about 50° C. and about 100° C. so as to form an intermediate particulate amorphous carbon nanomaterial in the disperse phase of aqueous micelles rather than the bulk phase;

separating the intermediate particulate amorphous carbon nanomaterial from the reverse microemulsion; and heating the intermediate particulate amorphous carbon nanomaterial for a period of time between about 1 hour and about 6 hours in the presence of an inert atmosphere so as to carbonize and transform the particulate carbon nanomaterial into the amorphous, powdered carbon nanomaterial having a surface area of at least 500 $m^2/g$, a graphitic content of at least 25%, and a conductivity of at least 150 S/m.

12. A method as recited in claim 11, wherein the at least one organic solvent, the at least one surfactant, and the water are added in a solvent:surfactant:water ratio between about 10:10:1 and about 20:1:1.

13. A method as recited in claim 11, wherein the organic solvent includes at least one of hexanes, cyclohexane, benzene, diethyl ether, trichloromethane, ethyl acetate, methyl methacrylate, toluene, phenyl ethers, or N-methyl pyrrolidone.

14. A method as recited in claim 11, wherein the surfactant includes at least one of an octylphenol ethoxylate, a phosphonic acid, a phosphinic acid, a polyethylene glycol monoalkyl ether, or a sulfonic acid.

15. A method as recited in claim 11, the heating further comprising carbonizing the intermediate particulate amorphous carbon nanomaterial a temperature between about 500° C. and about 2000° C.

* * * * *

UNITED STATES PATENT AND TRADEMARK OFFICE
CERTIFICATE OF CORRECTION

| | |
|---|---|
| PATENT NO. | : 8,318,122 B2 |
| APPLICATION NO. | : 12/248993 |
| DATED | : November 27, 2012 |
| INVENTOR(S) | : Zhang et al. |

It is certified that error appears in the above-identified patent and that said Letters Patent is hereby corrected as shown below:

On the title page item [73] should read --Headwaters Technology Innovation, LLC, Lawrenceville, NJ (US)--

On the title page item [56] Reference 6,627,314, change "Pyun" to --Matyjaszewski--

In the Specification
Column 1
Line 37, change "fallerenes" to --fullerenes--

Column 2
Line 28, change "that that" to --that--

Column 6
Lines 35-36, change "non-polar" to --polar--

Column 7
Line 10, change "a stirring" to --stirring--

Column 9
Line 56, change "2B" to --2B is a--

Signed and Sealed this
Eighteenth Day of March, 2014

Michelle K. Lee
*Deputy Director of the United States Patent and Trademark Office*